US011870081B2

(12) United States Patent
Vu et al.

(10) Patent No.: US 11,870,081 B2
(45) Date of Patent: Jan. 9, 2024

(54) METHOD OF PREPARING CATALYST CONTAINING PLATINUM DISPERSED ON GRAPHENE QUANTUM DOT CONTAINING CARRIER FOR DIRECT ALCOHOL FUEL CELL AND CATALYST OBTAINED BY THIS METHOD

(71) Applicants: Thu Ha Thi Vu, Hanoi (VN); Minh Quang Nguyen, Hanoi (VN); Tho Thi Lam, Hanoi (VN); Thao Thi Nguyen, Hanoi (VN); Ngoc Bich Nguyen, Hanoi (VN)

(72) Inventors: Thu Ha Thi Vu, Hanoi (VN); Minh Quang Nguyen, Hanoi (VN); Tho Thi Lam, Hanoi (VN); Thao Thi Nguyen, Hanoi (VN); Ngoc Bich Nguyen, Hanoi (VN)

( * ) Notice: Subject to any disclaimer, the term of this patent is extended or adjusted under 35 U.S.C. 154(b) by 167 days.

(21) Appl. No.: 16/856,022

(22) Filed: Apr. 23, 2020

(65) Prior Publication Data
US 2021/0005902 A1 Jan. 7, 2021

(51) Int. Cl.
*B01J 37/00* (2006.01)
*H01M 4/92* (2006.01)
*H01M 4/86* (2006.01)

(52) U.S. Cl.
CPC .... *H01M 4/926* (2013.01); *H01M 2004/8684* (2013.01)

(58) Field of Classification Search
CPC ................................ H01M 4/926; B01J 37/00
See application file for complete search history.

(56) References Cited

U.S. PATENT DOCUMENTS

| 8,211,593 | B2* | 7/2012 | Gu | H01M 4/8892 |
| | | | | 429/524 |
| 8,993,198 | B2* | 3/2015 | Yu | H01M 8/1004 |
| | | | | 429/524 |
| 10,283,779 | B2* | 5/2019 | Neumann | C01B 32/205 |
| 10,807,872 | B2* | 10/2020 | Xu | C25B 1/00 |
| 2013/0252138 | A1* | 9/2013 | Zhou | B01J 37/0207 |
| | | | | 502/5 |
| 2018/0345265 | A1* | 12/2018 | Wang | B01J 23/20 |
| 2020/0298221 | A1* | 9/2020 | Oh | H01M 4/8657 |
| 2021/0316290 | A1* | 10/2021 | Pedireddy | B01J 23/745 |
| 2021/0408557 | A1* | 12/2021 | Choi | B01J 23/44 |

* cited by examiner

*Primary Examiner* — Cam N. Nguyen
(74) *Attorney, Agent, or Firm* — Fulwider Patton LLP

(57) ABSTRACT

The invention relates to the method of preparing catalyst based on platinum (Pt), with a low Pt content, dispersed on carrier containing graphene quantum dots (Pt/GQDs or Pt/GO-GQDs) used for fuel cell with excellent activity in the electrochemical oxidation reaction of alcohol (for example, methanol, ethanol), applied as an anode catalyst for direct alcohol fuel cell (DAFC). At the same time, the invention also refers to the catalyst obtained by this method as an anode catalyst for DAFC.

20 Claims, 11 Drawing Sheets

Table 1

| Cataystt | Pt theoretical content (ratio to rGO); wt % | Etanol | | | | | |
|---|---|---|---|---|---|---|---|
| | | $H_2SO_4$ Medium | | | NaOH Medium | | |
| | | $I_F$ mA/mg$_{Pt}$ | $I_R$ mA/mg$_{Pt}$ | $I_F/I_B$ | $I_F$ mA/mg$_{Pt}$ | $I_R$ mA/mg$_{Pt}$ | $I_F/I_R$ |
| Pt/GQDs | 20 | 3432 | 5331 | 0,64 | 11255 | 6453 | 1,74 |
| | 8 | 3946 | 4651 | 0,85 | 8769 | 8916 | 0,98 |
| | 3 | 4717 | 7545 | 0,63 | 16363 | 9052 | 1,81 |
| | 1 | 3661 | 4739 | 0,77 | 11088 | 2481 | 4,47 |
| Pt/rGO+GQDs | 20 | 3381 | 3601 | 0,94 | 10285 | 7324 | 1,40 |
| | 8 | 4635 | 5002 | 0,93 | 12628 | 9207 | 1,37 |
| | 3 | 4968 | 5620 | 0,88 | 14859 | 10057 | 1,47 |
| | 1 | 2600 | 1659 | 1,57 | 9612 | 5890 | 1,63 |
| Cataystt | Pt theoretical content (ratio to rGO); wt % | Metanol | | | | | |
| | | $H_2SO_4$ Medium | | | NaOH Medium | | |
| | | $I_F$ mA/mg$_{Pt}$ | $I_R$ mA/mg$_{Pt}$ | $I_F/I_B$ | $I_F$ mA/mg$_{Pt}$ | $I_R$ mA/mg$_{Pt}$ | $I_F/I_R$ |
| Pt/GQDs | 20 | 9664 | 5435 | 1,78 | 42619 | 8333 | 5,12 |
| | 8 | 11588 | 6599 | 1,76 | 40974 | 8370 | 4,89 |
| | 3 | 13512 | 8111 | 1,67 | 49670 | 9623 | 5,16 |
| | 1 | 7929 | 2778 | 2,85 | 35619 | 7542 | 4,72 |
| Pt/rGO+GQDs | 20 | 9064 | 7040 | 1,28 | 18096 | 4291 | 4,21 |
| | 8 | 10737 | 11107 | 0,97 | 20700 | 4765 | 4,34 |
| | 3 | 13069 | 9184 | 1,42 | 22162 | 5368 | 4,13 |
| | 1 | 10560 | 8399 | 1,25 | 20241 | 4287 | 4,72 |

FIG. 12

METHOD OF PREPARING CATALYST CONTAINING PLATINUM DISPERSED ON GRAPHENE QUANTUM DOT CONTAINING CARRIER FOR DIRECT ALCOHOL FUEL CELL AND CATALYST OBTAINED BY THIS METHOD

FIELD OF THE INVENTION

The invention relates to a method of preparing a catalyst containing platinum (Pt), with a low Pt content, dispersed on a graphene quantum dots (Pt/GQDs) containing carrier for fuel cells, with excellent activity in an electrochemical oxidation reaction of alcohol (e.g., methanol, ethanol), applied as an anode catalyst for a direct alcohol fuel cell (DAFC). At the same time, the invention also relates to a catalyst obtained by this method as an anode catalyst for DAFC.

BACKGROUND AND PRIOR ART OF THE INVENTION

DAFC is a device that generates electricity through an electrochemical reaction mechanism. Unlike batteries that need to be recharged from an external source after a period of use, fuel cells can generate continuous current when there is a fuel supply to it. Among DAFC, the commercially available fuel cell is the Direct Methanol Fuel Cell (DMFC). The reason is that the complete oxidation reaction of methanol occurs more easily than the complete oxidation reaction of other alcohols. For example, compared to methanol fuel cells, fuel cells that use ethanol (Direct Ethanol Fuel Cell—DEFC) have a higher maximum theoretical energy density, less toxin and ethanol materials can be obtained from Lignocenlulose biomass fermentation process. However, the complete oxidation reaction of ethanol is unlikely to occur due to the difficulty of breaking the C—C bonds of ethanol to form $CO_2$ and $H_2O$.

Theoretically, ethanol is not completely oxidized. The main product formed is acetic acid. Since most reactions occur only on the surface of the ethanol structure, mainly on sp3 bonds of C—H and O—H, this leads to the formation of acetaldehyde and acetic acid, which cannot be further oxidized. The key to efficient oxidation of ethanol to $CO_2$ is the formation of aldehydes before breaking C—C bonds of the ethanol structure. In addition, the oxidation of ethanol at the anode electrode is slowed down by the absorption of carbon monoxide—an intermediate product of ethanol oxidation on the catalyst, causing catalyst poisoning. Therefore, improving catalyst activity used at anode electrode is an important study in the field of DAFC in general, and DEFC in particular.

Platinum (Pt) and Pt-based catalysts are considered as potential solutions to solve the above problem, because these catalysts are suitable for oxidation of short carbon chain organic molecules. However, up to now, practical applications of DEFC are still limited because the use of monolithic Pt electrodes is very expensive. In addition, monolithic Pt electrodes can easily be poisoned by adsorption of intermediate products in the oxidation of ethanol, such as acetaldehyde, acetic acid, etc.

Recently, to overcome the drawback of using very expensive monolithic Pt electrodes, the solution to disperse Pt active metals on graphene carriers, usually reduced graphene oxide (rGO), is one of the top attention choices. With excellent chemical and physical properties such as high electrical conductivity, large theoretical specific surface area ($\sim$2630 m$^2$/g), graphene helps to increase the dispersibility of active metals on the surface of the graphene carriers. However, up to now, Pt content of Pt/rGO catalyst, used as anode catalyst for DAFC, is still quite high, mainly in the range of 20% to 60%. For example, Lien Thi Tran, Quang Minh Nguyen, Minh Dang Nguyen, Hong Ngan Thi Le, Thao Thi Nguyen, Thu Ha Thi Vu, *Preparation and electrocatalytic characteristics of the Pt-based anode catalysts for ethanol oxidation in acid and alkaline media, International Journal of Hydrogen Energy*, 2018 published a synthesis process of Pt/rGO-based catalysts, used as anode catalyst for DEFC fuel cells. Published catalysts include Pt, Pt—Si, Pt—Al, Pt—Co, Pt—Ni and Pt—Al—Si, dispersed on rGO carriers. In that Pt/rGO catalyst (Pt accounts for 40% by weight compared to rGO) has Pt nanocrystal size about 3.00±0.62 nm and Pt—Al/rGO catalyst (Pt accounts for 20% compared to rGO), Pt size of 2.72±0.63 nm, respectively, are the lowest and highest electrochemical active catalysts among the published catalysts. In acidic medium, Pt/rGO catalysts with ECSA value=34.88 m$^2$/g$_{Pt}$ and forward potential scanning current density $I_F$=328 mA/mg$_{Pt}$, corresponding electrochemical values of Pt—Al/rGO catalysts 121.2 m$^2$/g$_{Pt}$ and 1194 mA/mg$_{Pt}$, respectively. In the basic medium, the ECSA and $I_F$ values of Pt/rGO and Pt—Al/rGO were 103.64 m2/g$_{Pt}$, 2293 mA/mg$_{Pt}$ and 188.48 m2/g$_{Pt}$, 3691 mA/mg$_{Pt}$, respectively. Gladys Arteaga, Luis M. Rivera-Gavidia, Stephanie J. Martinez, Ruben Rizo, Elena Pastor and Gonzalo Garcia, Methanol oxidation on graphenic-supported platinum catalysts, Surfaces, 2019 published a method of preparing Pt/C catalysts (Carbon Vucal), Pt/rGO-TT (Reduced Graphene oxide by Thermal Treatment), Pt/N-rGO (Nitrogen-modified rGO) for electrochemical oxidation reaction of methanol, in acidic medium (solution of $CH_3OH$ 2 M+$H_2SO_4$ 0.5 M). The study results showed that three catalysts Pt/C, Pt/rGO-TT and Pt/N-rGO with active phase sizes of Pt are 3.28±0.25 nm, 3.32±0.43, and 3.14±0.50 nm, respectively, the Pt content determined by SEM-EDX in all three samples was 19±1.5% compared to the catalytic mass (the theoretical Pt content is 20%). Forward potential scanning current density according to CV (Cyclic Voltametry) measurement is 149 mA/mg$_{Pt}$ (Pt/C), <174 mA/g$_{Pt}$ (Pt/rGO-TT), respectively, Pt/N-rGO catalyst has pic signal very low, almost no expression of electrochemical activity in the research reaction.

There are several published works that mention catalysts based on Pt/rGO, with a Pt content of less than 20%. However, the activity of these catalysts is not remarkablly superior. For example, S. Themsirimongkon, K. Ounnunkad, S. Saipanya, *Electrocatalytic enhancement of platinum and pladium metal on polydopamine reduced graphene oxide support alcohol oxidation, Journal of Colloid and Interface Science*, 2018, published the results of the research, synthesis of catalysts based on the dispersion of Pt, Pd, Pt—Pd, Pt—Ru combination on the carriers such as GO (Graphene Oxide), C (Carbon Vucal), and PDA-rGO (Nitrogen-modified rGO by polydopamine), with the total content of metals is 10% by catalyst weight. The activity of the catalysts was studied in the electrochemical oxidation reaction of both alcohols: $CH_3OH$ 1 M+$H_2SO_4$ 0.5 M and $C_2H_5OH$ 1 M+$H_2SO_4$ 0.5 M. Among these published catalysts, Pt/PDA-rGO, Pt—Pd/PDA-rGO and Pt—Pd3/PDA-rGO catalysts have the highest electrochemical surface area (ECSA), respectively 195.3 m$^2$/g; 214.5 m$^2$/g; 203.5 m$^2$/g. The crystal phase size of these catalysts is the smallest among the published catalysts, respectively 3.26±0.80 nm; 3.51±1.13 nm and 5.35±0.96 nm. In the $CH_3OH$ 1 M+$H_2SO_4$ 0.5 M reaction medium, with cyclic voltammetry scanning measurement, the forward potential scanning current density of the Pt—Pd/PDA-rGO catalyst is the largest, reaching 225 mA/mg$_{Pt}$. The Pt/PDA-rGO catalyst has an IF value of 182 mA/mg$_{Pt}$. The IF value of Pt/PDA-rGO catalyst is much higher the smallest IF value of Pt—Ru/C catalyst. Pt—Ru/C catalyst has the smallest IF value, 11.9 mA/mg$_{Pt}$. On the other hand, in the reaction medium of $C_2H_5OH$ 1 M+$H_2SO_4$ 0.5 M, the highest catalytic activity is Pt/PDA-rGO catalyst (IF=400.8 mA/mg$_{Pt}$) and the lowest catalyst activity is Pt$_3$Pd/PDA-rGO catalyst (IF=108.0 mA/mg$_{Pt}$). Yulong Ma, Shidong Fang and Qi Wang, *The tunable plasma synthesis of Pt-reduced grapheme oxide nanocomposte, AIP Advances*, 2017, refers to Pt/P-rGO catalyst (containing 9% Pt compared to the mass of catalysts), in which the P-rGO carrier is prepared by improved Hummer method combining plasma irradiation with different capacities, in flow of $H_2$. With a 100 W plasma irradiation capacity, catalyst has the highest activity, with the value of the forward potential scanning current density in CV measurement ($CH_3OH$ 1 M+$H_2SO_4$ 0.5 M medium), $I_F$ is respectively 366.4 mA/mg$_{Pt}$. Thu Ha Thi Vu, Thanh Thuy Thi Trang, Hong Ngan Thi Le, Lien Thi Tran, Phuong Hoa Thi Nguyen, Minh Dang Nguyen, Bui Ngoc Quynh, *Synthesis of Pt/rGO catalysts with two different agents and their methanol electrooxidation activity, Materials Research Bulletin*, 2015, published the catalyst synthesis process with two different reducing agents NaBH$_4$ and ethylene glycol (EG). Survey the electrochemical activities of two catalysts synthesized from two reducing agents, by cyclic voltammetry scanning measurement (CV) ($CH_3OH$ 1 M+$H_2SO_4$ 0.5 M medium), showing that catalysts Pt/rGO-B (reduced by EG) has an forward potential scanning current density $I_F$ of 413 mA/mg$_{Pt}$ higher 1.5 times than Pt/rGO-A catalystt (reduced by NaBH$_4$), 282 mA/mg$_{Pt}$. In addition, the document also published the results of surveying the effect of Pt content varying from 10-60% compared with rGO mass according to the theory. Experimental results showed that 40% Pt/rGO catalyst (reduced by EG) gived the highest ECSA and IF results, reaching 45 m$^2$/g and 326 mA/mg$_{Pt}$, respectively.

Besides rGO carriers, recently, graphene quantum dots (GQDs) are also mentioned as a potential carrier for catalysts containing active Pt. For example, the works of Limei Chen, Yi Peng, Jia-Lu Lu, Nan Wang, Peiguang Hu, Bingzhang Lu, Shaowei Chen (*Platinum nanoparticles encapsulated in nitrogen doped graphene quantum dots: Enhanced electrocatalytic reduction of oxygen by nitrogen dopants, international journal of hydrogen energy* 42, 29192-29200, 2017) refers to the electrochemical reduction catalysts for the cathode of alkaline anion-exchange membrane fuel cells based on dispersion of Pt on quantum dots (Pt/GQDs). However, no work has been published regarding the preparation of catalysts based on dispersion of Pt on graphene quantum dots for electrochemical oxidation reaction of alcohol at the anode of DAFC. Moreover, in the said work, the content of Pt active metal is also very high, up to over 60% by weight. It can be said that the consumption of a large amount of precious metals, plus the preparing of graphene quantum dots is very costly due to the long period of dialysis, using expensive materials that make the cost of the catalyst is always high and not feasible for practical application.

From above knowledge, the inventors found that finding a moderate cost-effective method has the ability to easily expand the preparation of highly active catalysts in electrochemical oxidation reaction of alcohol, applied as anode catalyst for DAFC is necessary. Specifically, the precious metal saving method for preparing catalysts containing Pt, with low Pt content, dispersed on carriers containing graphene quantum dots (Pt/GQDs), has excellent activity in alcohol electrochemical oxidation reactions, for example, methanol, ethanol, as an catalyst for fuel cells using direct alcohol (Direct Alcohol Fuel Cell—DAFC)

SUMMARY OF THE INVENTION

It is an object of the current invention to provide a method to prepare a anode catalyst of DAFC containing Pt, with a low Pt content, dispersed on graphene quantum dots (Pt/GQDs) containing carrier, at low cost thanks to economical use of precious metals, namely catalyst containing Pt dispersed on graphene quantum dots (Pt/GQDs) and catalyst containing Pt dispersed on mixture of oxide graphene and graphene quantum dots (Pt/GO-GQDs).

It is other object of the current invention to provide catalyst containing Pt, with a low Pt content, dispersed on graphene quantum dot containing carrier, namely catalyst containing Pt dispersed on graphene quantum dots (Pt/GQDs) and catalyst containing Pt dispersed on mixture of graphene oxide and graphene quantum dots (Pt/GO-GQDs), which have excellent activity in electrochemical oxidation reaction of alcohol, to be anode catalyst in DAFC.

To achieve this goal, the present invention provides a method for preparing anode catalyst of DAFC based on Pt dispersed on graphene quantum dots, composing the following steps:

1. Preparing a Carrier Containing Graphene Quantum Dots

Prepare a carrier containing graphene quantum dots by applying carbon fiber, which was ground to powder, to react with a mixture of 70% HNO3 acid and 98% $H_2SO_4$ acid, with a mass ratio of carbon fiber powder to a volume of 70% HNO3 acid and 98% $H_2SO_4$ acid in the range 1:20:30 to 1:60:90, under detector ultrasound reaction, with a capacity of 750 W and then a reflux reaction. Allow the mixture to cool down to room temperature, adjust to pH=7 with NaOH solution in cold ice, then obtaining a carrier containing graphene quantum dots (GQDs) can be carried out by:

a. add the obtained mixture to the dialysis membrane 1000 Da, conduct dialysis with deionized water to obtain the solution containing graphene quantum dots (GQDs) in the dialysis membrane for use as carrier, or b. crystalize salts present in the neutralizing mixture, filter to remove crystallized crystals from the filtrate to obtain a filtrate containing a mixture of graphene oxide and graphene quantum dot (GO-GQDs) for use as carrier.

2. Prepare Catalyst Based on Pt Dispersed on Carrier Containing Graphene Quantum Dots Add the solution containing the Pt precursor to the liquid obtained in step 1(a) or step 1(b) then carry out the ultrasonic reaction, after that proceed with Pt ion reduction with 0.15 M NaBH$_4$ solution at the temperature ranging from 25° C. to 80° C. Next, recover and purify solid products by centrifugation and washing by centrifugation several times with demineralized water, dry in vacuum to obtain the catalyst based on Pt dispersed on graphene quantum dots and catalyst based on Pt dispersed on carrier containing mixture of graphene oxide and graphene quantum dots, respectively. The solid obtained was used as anode catalyst for DAFC.

In addition, according to another method, catalyst based on Pt dispersed on mixture of graphene oxide and graphene quantum dots (GO-GQDs) can also be obtained by microwave method, including the following steps:

Add ethylene glycol 99.5% to GO-GQDs mixture, with the volume ratio of ethylene glycol solution to the volume of the mixture of GO-GQDs ranging from 2:1 to 7:1. Next, carry out transducer ultrasound reaction, with a capacity of 750 W for about 1 minute to 12 minutes, obtaining EG-GO-GQDs mixture. Then, add $H_2PtCl_6$ 0.01 M solution to the EG-GO-GQDs mixture, with the volume ratio of $H_2PtCl_6$ 0.01 M solution to the volume of the GO-GQDs mixture ranging from 1:5 to 1:97. Next, transfer the mixture to a microwave reactor, heat the mixture to about 200° C. for 20 to 30 minutes; keep stable temperature for 10 to 60 minutes. Allow the mixture to cool down to room temperature. The process of recovery and purification of solid products is carried out by centrifugation to collect solid products and then wash several times with demineralized water; drying solid in vacuum at 50° C. The solid obtained was used as anode catalyst for DAFC.

According to another method, the invention suggests a catalyst based on Pt dispersed on carrier containing graphene quantum dots, namely catalyst based on Pt dispersed on a graphene quantum dot or catalyst based on Pt dispersed on mixture of graphene oxide and graphene quantum dots with a Pt content in the catalyst ranging from 1 to 20% by weight.

BRIEF DESCRIPTION OF THE DRAWINGS

FIG. 12. Table 1. Comparison of alcohol electrochemical activity of catalysts in acidic medium and alkaline medium.

DETAILED DESCRIPTION OF THE INVENTION

Figure 1:
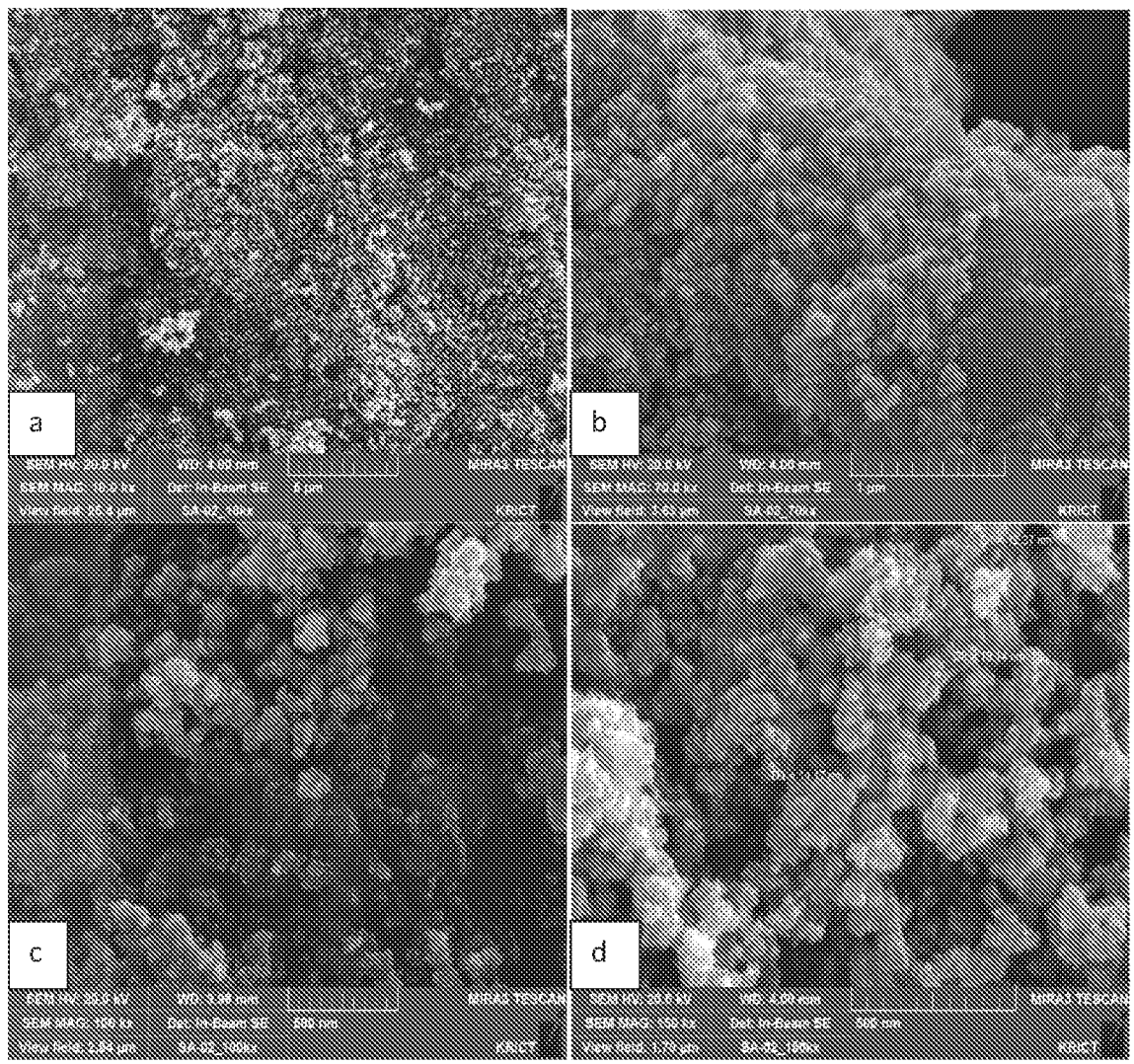
FIG. 1 (*a-d*). SEM image of 20% Pt/rGO-GQDs(R) catalyst at different resolutions.

The term "graphene" used in this invention means that graphene material has the number of layers less than 10.

The term "graphene quantum dots" (GQDs) used in this invention means that graphene crystals are small enough to have the properties of quantum mechanics.

The term "carrier containing graphene quantum dots" used in this invention means that carrier only contains graphene quantum dots or mixture of graphene oxide and graphene quantum dots.

The term "mixture of graphene oxide and graphene quantum dots" used in this invention means a mixture of graphene oxide and graphene quantum dots, which has been reduced by reducing agent, after dispersing noble metal salts on the surface. Mixture of graphene oxide and graphene quantum dots was created in the process of graphene quantum dots synthesizing without going through the phase of refining products to separate graphene quantum dots.

The term "Pt precursor" used in this invention means an aqueous solution of $H_2PtCl_6$ salt, having a concentration of 0.01 M.

The term "carbon fiber powder" used in this invention is powder of pure commercial carbon fabric ground to the size of less than 0.1 mm of, with a carbon content of over 98%.

The term "reflux method" used in this invention means that the reaction process takes place in the refluxing condition.

The term "microwave method" used in this invention means that the reaction process takes place under the condition of using a microwave reactor.

The term "anode catalyst of DAFC" used in this invention means that the catalyst is used to coat the anode electrode of DAFC. This catalyst plays an important role, determining the life and durability of fuel cells.

The term "Pt content in catalyst" used in this invention means that the Pt content is theoretically calculated based on the mass percentage of Pt compared to rGO, GO-GQDs or GQDs carrier.

The term "catalyst-coating on the electrode surface" used in this invention means that the dispersion process of 1 mg of catalyst powder into a solution containing 0.9 mL of ethanol and 0.1 mL of 5% Nafion solution, ultrasonic vibration for 30 minutes, to produce a coating mixture, then take 10 μl of the coating mixture to coat the glass carbon electrode (5 mm in diameter) and allow to dry naturally at room temperature. The catalyst-coated electrode is the working electrode.

The term "electrochemical device system" used in this invention means the device system with three electrodes, including the working electrode, the platinum electrode as the reference electrode, and the Ag/AgCl electrode as the comparison electrode.

The term "current density" used in this invention means the current density of the ethanol oxidation reaction on the catalyst, calculated by the mass of Pt present in the catalyst (mA/Mg$_{Pt}$).

The term "$I_F/I_R$" used in this invention meaning that the ratio of the reaction current density in the forward scanning direction (produced by the ethanol oxidation reaction) and the reaction current density in the backward scanning direction (produced by the oxidation reaction of intermediates such as CO of ethanol oxidation reaction). $I_F/I_R$ values are used to assess the tolerance of intermediate products, such as CO, of catalysts.

The term "catalytic electrochemical oxidation activity" used in this invention means the electrochemical activity of the catalyst in alcohol oxidation reaction, evaluated by the circulating potential line in an acidic medium (ranging from −0.2 to 1 V, with a at a scan rate of 50 mV·s$^{-1}$, in $CH_3OH$ 1 M+$H_2SO_4$ 0.5 M solution or $C_2H_5OH$ 1 M+$H_2SO_4$ 0.5 M solution) and in an alkaline medium (ranging from −1 to 0.5 V, with a at a scan rate of 50 mV·s$^{-1}$, in $CH_3OH$ 1 M+NaOH 0.5 M solution, or $C_2H_5OH$ 1 M+NaOH 0.5 M solution).

Method of preparing catalyst based on Pt, with a low Pt content, dispersed on graphene quantum dots, namely catalyst based on Pt dispersed on graphene quantum dots (Pt/GQDs), or catalyst based on Pt dispersed on mixture of graphene oxide and graphene quantum dots (Pt/GO-GQDs), used as anode catalyst for DAFC, including two main steps.

The first step is to prepare support containing graphene quantum dots by oxidizing the layer and cutting carbon fiber powder with a strong acid mixture, under the effect of ultrasound and reflux reaction; followed by neutralization process and suitable treatment process to optionally recover the liquid containing graphene quantum dots or mixture of graphene oxide and graphene quantum dots.

The second step is to prepare catalyst based on Pt dispersed on graphene quantum dots.

The process of oxidizing the layer and cutting carbon fiber powder with a strong acid mixture, under the effect of ultrasound and reflux reaction, is performed at the mass ratio of carbon fiber powder to the volume of $HNO_3$ 70% and $H_2SO_4$ 98% ranging from 1:20:30 to 1:60:90, more preferably from 1:30:45 to 1:48:72, most preferably from 1:32:48 to 1:48:72. If the amount of acid is too low, the oxidation efficiency will not be high, and if there is too much acid, it will cause chemical waste. The duration of the ultrasonic reaction ranges from 10 to 30 minutes, more preferably from 13 to 25 minutes, most preferably from 15 to 20 minutes. Recirculation is performed at temperatures between 100° C. and 140° C., preferably between 110° C. and 130° C., most preferably between 115° C. and 125° C., during the reflux period from 10-15 hours, more preferably within 11-14 hours, most preferably within 12-13 hours. After that, cool down to room temperature, proceed to neutralize the mixture to pH=7 with NaOH 5 M solution in cold ice. The neutralizing solution is arbitrarily processed as follows:

a. Proceed to dialyze by adding the obtained mixture to the dialysis membrane 1000 Da, conduct dialysis with deionized water for a period of 5 days, changing water every 8 hours, to obtain the solution contained graphene quantum dot (GO-GQDs).

b. Or the process could proceed to crystalize salts present in the neutralizing mixture, filter to remove crystalline crystals from the filtrate to obtain a filtrate containing a mixture of graphene oxide and graphene quantum dot (GO-GQDs).

The preparation of catalyst based on Pt dispersed on graphene quantum dots was done by adding Pt precursor, namely $H_2PtCl_6$, to liquid containing GQDs, whose content is adjusted to 0.7 mg/mL, at a volume ratio of $H_2PtCl_6$ 0.01 M solution to the volume of liquid containing GQDs ranging from 1:14 to 1:286, more preferably from 1:14 to 1:93, most preferably from 1:35 to 1:93 to perform an ultrasound reaction. The duration of the ultrasound reaction is in the range of 1 to 12 minutes, more preferably from 3 to 10 minutes, most preferably from 5 to 8 minutes. Pt ion reduction process is carried out at the volume ratio of $NaBH_4$ 0.15 M solution to the volume of the reaction mixture ranging from 1:8 to 1:9. The temperature of the reduction reaction ranges from 25° C. to 80° C., more preferably from 35° C. to 70° C., most preferably from 40° C. to 60° C. The reaction time ranges from 1 to 6 hours, more preferably from 1 to 5 hours, most preferably from 2 to 4 hours. The process of recovery and purification of solid products is carried out by centrifugation and washing with centrifugation several times with demineralized water, more preferably repeated at least 3 times; dry in vacuum at 50° C. for 12 hours. The solid obtained was used as anode catalyst for DAFC.

The step of preparing catalyst based on Pt dispersed on mixture of graphene oxide and graphene quantum dots (Pt/rGO-GQDs) is done by the following two methods:

Reflux method: Add Pt precursor, namely $H_2PtCl_6$, into support mixture of graphene oxide and graphene quantum dots (GO-GQDs) with a volume ratio of $H_2PtCl_6$ 0.01 M solution to the volume of liquid containing GO-GQDs mixture whose content is adjusted to 2 mg/mL ranging 1:5 to 1:97, more preferably from 1:5 to 1:33, most preferably from 1:7 to 1:33 to conduct transducer ultrasound reaction, with a capacity of 750 W for a period of 1 to 12 minutes, more preferably from 3 to 10 minutes, most preferably from about 5 to 8 minutes. Next, heat the mixture to a temperature from 25° C. to 80° C. to conduct the reduction reaction to deionize noble metal into metal and graphene to graphene oxide with a $NaBH_4$ 0.15 M solution at a volume ratio of $NaBH_4$ 0.15 M solution to the volume of the reaction mixture ranging from 1:8 and 1:9. The temperature of the reduction reaction ranges from 25° C. to 80° C., more preferably from 35° C. to 70° C., most preferably from 40° C. to 60° C. The reduction reaction is carried out for 1 to 6 hours, more preferably from 1 to 5 hours, most preferably from 2 to 4 hours. The process of recovery and purification of solid products is carried out by filtration, washing several times with demineralized water, most preferably repeated at least 3 times; dry in vacuum at 50° C. for 12 hours. The solid obtained was used as anode catalyst for DAFC.

Microwave method: Add ethylene glycol 99.5% to the GO-GQDs mixture whose content is adjusted to 2 mg/mL with the volume ratio of ethylene glycol solution to the volume of mixtures containing GO-GQDs ranging from 2:1 to 7:1, more preferably from 2:1 to 4:1, most preferably from 5:1 to 7:1. Next, carry out transducer ultrasound reaction, with a capacity of 750 W for about 1 minute to 12 minutes, more preferably from 3 to 10 minutes, most preferably from 5 to 8 minutes, to get the mixture EG-GO-GQDs. Then, add $H_2PtCl_6$ 0.01 M solution to the EG-GO-GQDs mixture, with a volume ratio of 0.01 M $H_2PtCl_6$ solution compared to the volume of the GO-GQDs mixture ranging from 1:5 to 1:97, preferably between 1:5 and 1:33, preferably between 1:7 and 1:33. Next, transfer the mixture to a microwave reactor, heat the mixture to about 200° C. for 20 to 30 minutes; keep the temperature stable for 10 to 60 minutes, more preferably in about 20 to 50 minutes, most preferably in about 30 to 40 minutes. Allow the product mixture to cool to room temperature. The process of recovery and purification of solid products is carried out by centrifuging to collect solid products and then washing several times with demineralized water, preferably repeated at least 3 times. Dry the solid in vacuum at a temperature of 50° C. for 12 hours.

EXAMPLES

The invention will be better understood from the examples given below. These examples are only illustrative but not limited to the scope of the invention.

Example 1

Prepare GO-GQDs Mixture

Take 25 g of carbon fiber powder+1000 mL of $HNO_3$ 70% (Sigma)+1500 mL of $H_2SO_4$ 98% (Sigma), transducer ultrasound, with a capacity of 750 W, within 17 minutes. Then, heat the mixture to a temperature of 120° C. for 12 hours in a fume hood. Then, cool down to room temperature, adjust to pH=7 with 5 M NaOH solution in cold ice. Crystalize to remove salt in solution; conduct quick filtering. The resulting liquid contains both graphene oxide and graphene quantum dots used as anode catalyst for DAFC.

Example 2

Prepare GQDs

Take 0.25 g of carbon fiber powder+10 mL of $HNO_3$ 70% (Sigma)+15 mL of $H_2SO_4$ 98% (Sigma), transducer ultrasound, with a capacity of 750 W, within 17 minutes. Then, heat the mixture to a temperature of 120° C. for 12 hours in a fume hood. Then, cool down to room temperature, adjust to pH=7 with NaOH 5 M solution in cold ice. Add the obtained mixture to the dialysis membrane 1000 Da; conduct dialysis with deionized water for a period of 5 days, changing water every 8 hours. The solution contained in the dialysis membrane is GQDs solution.

Example 3

Prepare 20% Pt/GQDs

Take 80 mL of GQDs solution whose content is adjusted to 0.7 mg/mL. Add 5.7 mL of $H_2PtCl_6$ 0.01 M solution, transducer ultrasound, with a capacity of 750 W, within 6 minutes. Heat the mixture to 50° C.; slowly drop 28 mL of 0.15 M $NaBH_4$ solution; keep temperature stable for 3 hours. Then, filter reaction mixture for solid recovery. Treat solids by centrifugation and washing with centrifugation several times with demineralized water; dry in vacuum at 50° C. for 12 hours. The solid obtained at this time, denoted by 20% Pt/GQDs, is used as anode catalyst for DAFC.

Example 4

Prepare 8% Pt/GQDs

Take 80 mL of GQDs solution in which content is adjusted to 0.7 mg/mL; add 2.3 mL of $H_2PtCl_6$ 0.01 M solution, transducer ultrasound, with a capacity of 750 W, within 6 minutes. Heat the mixture to 50° C.; slowly drop 28 mL of $NaBH_4$ 0.15 M solution; keep thermally stable for 3 hours. Then, filter reaction mixture for solid recovery. Treat solids by centrifugation and washing with centrifugation several times with demineralized water; dry in vacuum at 50° C. for 12 hours. The solid obtained at this time, denoted by 8% Pt/GQDs, is used as anode catalyst for DAFC.

Example 5

Prepare 3% Pt/GQDs

Take 80 mL of GQDs solution in which content is adjusted to 0.7 mg/mL. Add 0.9 mL of $H_2PtCl_6$ 0.01 M solution, transducer ultrasound, with a capacity of 750 W, within 6 minutes. Heat the mixture to 50° C.; slowly drop 28 mL of $H_2PtCl_6$ 0.01 M solution; keep thermally stable for 3 hours. Then, filter reaction mixture for solid recovery. Treat solids by centrifugation and washing with centrifugation several times with demineralized water; dry in vacuum at 50° C. for 12 hours. The solid obtained at this time, denoted by 3% Pt/GQDs, is used as anode catalyst for DAFC.

Example 6

Prepare 1% Pt/GQDs

Take 80 mL of GQDs solution in which content is adjusted to 0.7 mg/mL. Add 0.3 mL of $H_2PtCl_6$ 0.01 M solution, transducer ultrasound, with a capacity of 750 W, within 6 minutes. Heat the mixture to 50° C.; slowly drop 28 mL of $NaBH_4$ 0.15 M solution; keep thermally stable for 3 hours. Then, filter reaction mixture for solid recovery. Treat solids by centrifugation and washing with centrifugation several times with demineralized water; dry in vacuum at 50° C. for 12 hours. The solid obtained at this time, denoted as 1% Pt/GQDs, is used as anode catalyst for DAFC.

Example 7

Prepare 20% Pt/rGO-GQDs by Reflux Method

Step 1: Add 32 mL of $H_2PtCl_6$ 0.01 M solution to 160 mL of GO-GQDs solution of which is adjusted to 2 mg/mL, then conduct a mixed ultrasound to obtained mixture in the transducer ultrasonic device, with a capacity of 750 W within 6 minutes. Heat the mixture to 50° C., then slowly drop 56 mL of $NaBH_4$ 0.15 M solution into the mixture; keep thermally stable for 3 hours.

Step 2: Filter the reaction mixture in step 1 to recover solids. Treat solids by filtration and washing several times with demineralized water; dry in vacuum at 50° C. for 12 hours. The solid obtained at this time, denoted 20% Pt/rGO-GQDs (R), is used as anode catalyst for DAFC.

Example 8

Prepare 20% Pt/rGO-GQDs by Microwave Method

Step 1: Add 360 mL of ethylene glycol 99.5% to 160 mL of GO-GQDs solution whose content is adjusted to 2 mg/mL. Conduct a mixed ultrasound in the transducer ultrasound device, with a capacity of 750 W within 6 minutes, to obtain an EG-GO-GQDs mixture. Then, add 19.6 mL of $H_2PtCl_6$ 0.01 M solution to the EG-GO-GQDs mixture. Next, transfer the mixture to a microwave reactor, heat the mixture to about 200° C. for 25 minutes; keep thermally stable for 30 minutes.

Step 2: Cool down the mixture obtained from step 1 to room temperature. Conduct filtering and washing the mixture to collect solid product, and then wash the solid with demineralized water, also by centrifugation. Dry the solid in a vacuum at 50° C. for 12 hours. The product obtained, denoted by 20% Pt/rGO-GQDs(M), is characterized by physicochemical properties, and evaluated electrochemical activity for use as anode catalyst for DAFC.

Example 9

Prepare 8% Pt/rGO-GQDs by Reflux Method

Step 1: Add 12.8 mL of $H_2PtCl_6$ 0.01 M solution to 160 mL of GO-GQDs solution whose content is adjusted to 2 mg/mL, then conduct a mixed ultrasound in the transducer ultrasound device, with a capacity of 750 W within 6 minutes. Heat the mixture to 50° C., then slowly drop 56 mL of $NaBH_4$ 0.15 M solution into the mixture; keep thermally stable for 3 hours.

Step 2: Filter the reaction mixture in step 1 to recover solids. Treat solids by filtration and washing several times with demineralized water; dry in vacuum at 50° C. for 12 hours. The solid obtained at this time, denoted by 8% Pt/rGO-GQDs(R), is used as anode catalyst for DAFC.

Example 10

Prepare 3% Pt/rGO-GQDs by Reflux Method

Step 1: Add 4.8 mL of $H_2PtCl_6$ 0.01 M solution to 160 mL of GO-GQDs solution whose content is adjusted to 2 mg/mL, then conduct a mixed ultrasound in the transducer ultrasound device, with a capacity of 750 W within 6 minutes. Heat the mixture to 50° C., then slowly drop 56 mL of $NaBH_4$ 0.15 M solution into the mixture; keep thermally stable for 3 hours.

Step 2: Filter the reaction mixture in step 1 to recover solids. Treat solids by filtration and washing several times with demineralized water; dry in vacuum at 50° C. for 12 hours. The solid obtained at this time, denoted by 3% Pt/rGO-GQDs(R), is used as an electrochemical catalyst.

Example 11

Prepare 1% Pt/rGO-GQDs by Reflux Method

Step 1: Add 1.6 mL of $H_2PtCl_6$ 0.01 M solution to 160 mL of GO-GQDs solution whose content is adjusted to 2 mg/mL, then conduct a mixed ultrasound in the transducer ultrasound device, with a capacity of 750 W within 6 minutes. Heat the mixture to 50° C., then slowly drop 56 mL of $NaBH_4$ 0.15 M solution into the mixture; keep thermally stable for 3 hours.

Step 2: Filter the reaction mixture in step 1 to recover solids. Treat solids by filtration and washing several times with demineralized water; dry in vacuum at 50° C. for 12 hours. The solid obtained at this time, denoted by 1% Pt/rGO-GQDs(R), is used as an electrochemical catalyst.

Characteristic Properties of 20% Pt/rGO-GQDs (R) Catalysts

SEM Analysis

SEM microscope image (FIG. 1a-d) of 20% Pt/rGO-GQDs(R) catalyst shows the surface structure of the catalyst. Particularly, the catalyst has a porous surface consisting of fairly uniformly distributed Pt nanoparticles on the surface of the material.

HRTEM Analysis

Figure 2:
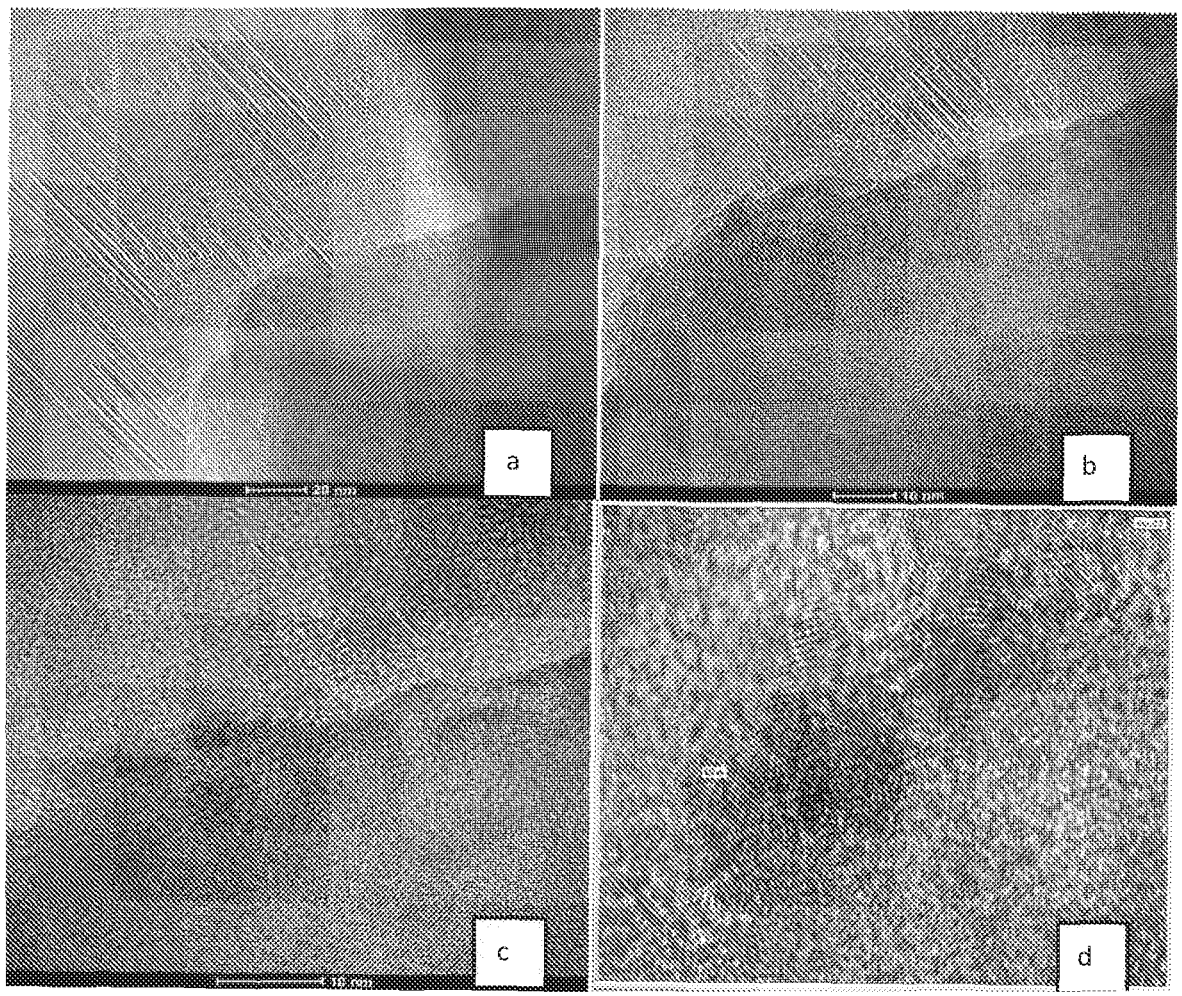
FIG. 2 (*a-d*). TEM and HRTEM images of GO-GQDs solution at different resolutions.
Figure 3:
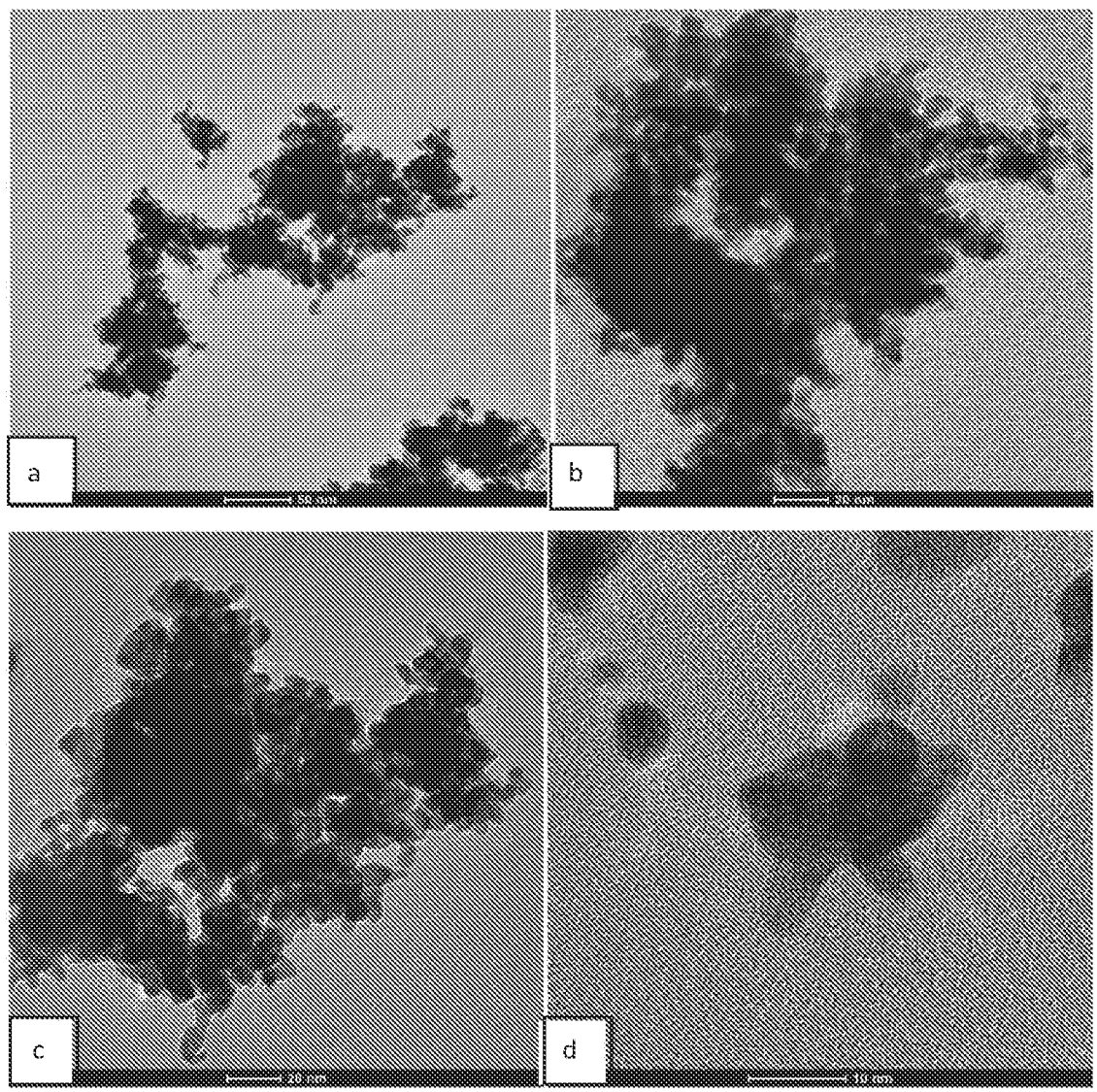
FIG. 3 (*a-d*). TEM image and HRTEM of 20% Pt/rGO-GQDs(R) catalyst.

Structural morphology of GO-GQDs and 20% Pt/rGO-GQDs(R) catalyst, characterized by transmission electron microscopy (TEM) and high resolution electron microscope (HRTEM), are shown in FIG. 2 and FIG. 3.

Characteristic results from FIGS. 2a-c show that uniform dispersion of GQDs has an average size of 3-5 nm. At the same time, it also shows the appearance of transparent graphene fragments in the form of thin films alternating graphene quantum dots. The image with higher magnification (FIG. 2d) shows the appearance of graphene layers with a value of 0.24 nm. Thus, the results of TEM and HRTEM characteristics show the simultaneous appearance of graphene and graphene quantum dots in GO-GQDs products.

FIGS. 3a-d show TEM and HRTEM results of 20% Pt/rGO-GQDs(R) samples. TEM image (FIGS. 3a-c) shows that Pt particles with spherical structure of 8-10 nm in diameter, disperse quite evenly. HRTEM image (FIG. 3) shows the dispersed Pt particles on both graphene and graphene quantum dots.

Figure 4:
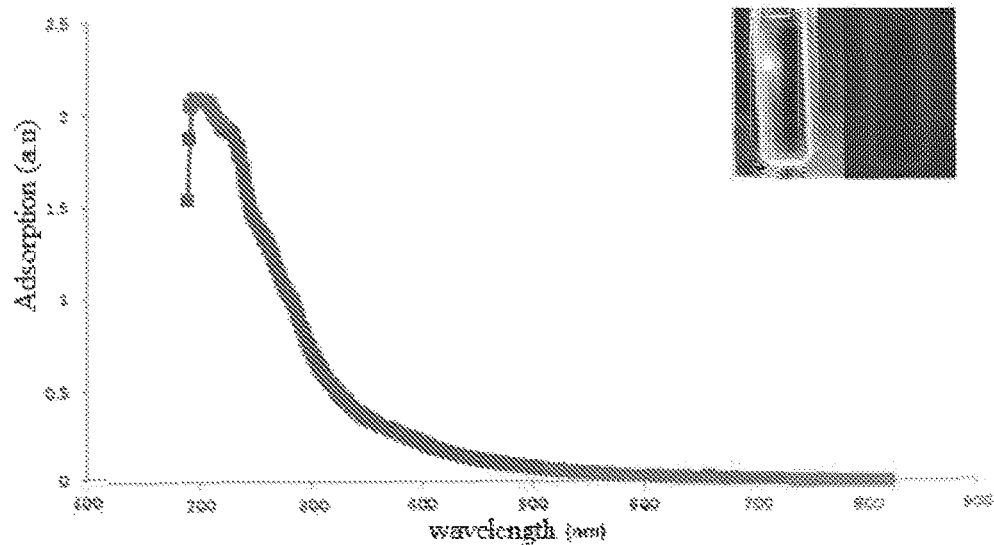
FIG. 4. UV-Vis spectrum of GO-GQDs solution.
Figure 4:
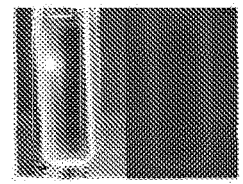
Figure 5:
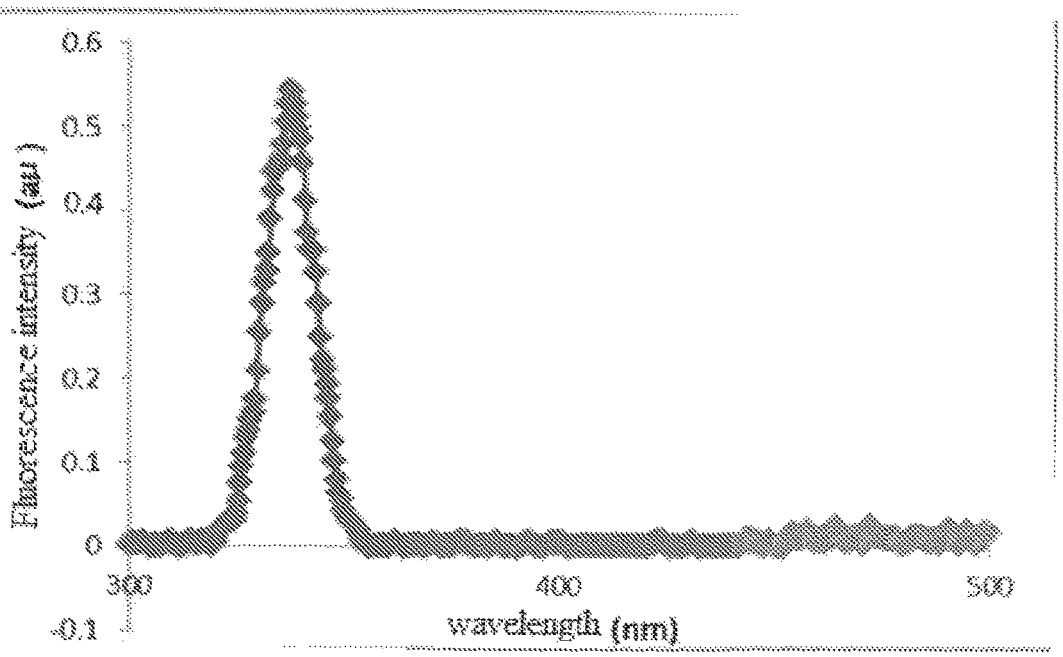
FIG. 5. Fluorescent spectrum of GO-GQDs.

Optical Characterization Analysis of GO-GQDs: UV-Vis Spectrum and Fluorescence Spectra FIGS. 4 and 5 describe the optical properties of GO-GQDs. UV-Vis spectra of GO-GQDs in water (FIG. 4a) show two absorption bands at 250 and 330 nm showing two electronic transitions that occurred under UV light. In particular, strong absorption occurs at a wavelength of 250 nm, and weak absorption happens at a wavelength of 330 nm. FIG. 5 shows the fluorescence spectrum (PL) of GO-GQDs. When changing the excitation wavelength from 340 to 460 nm, the fluorescence density of GO-GQDs also varies. Specifically, GO-GQDs peaks at a wavelength of 330 nm that is similar to those obtained from UV-Vis spectra. However, the observed GO-GQDs solution is brownish yellow in daylight but GO-GQDs does not have the ability of luminescence under UV light. The density of fluorescence obtained from weak PL analysis results may be due to the appearance of impurities in GO-GQDs (not refined) that hindered optical signals of GQDs present in the product.

IR Spectrum Analysis

Figure 6:
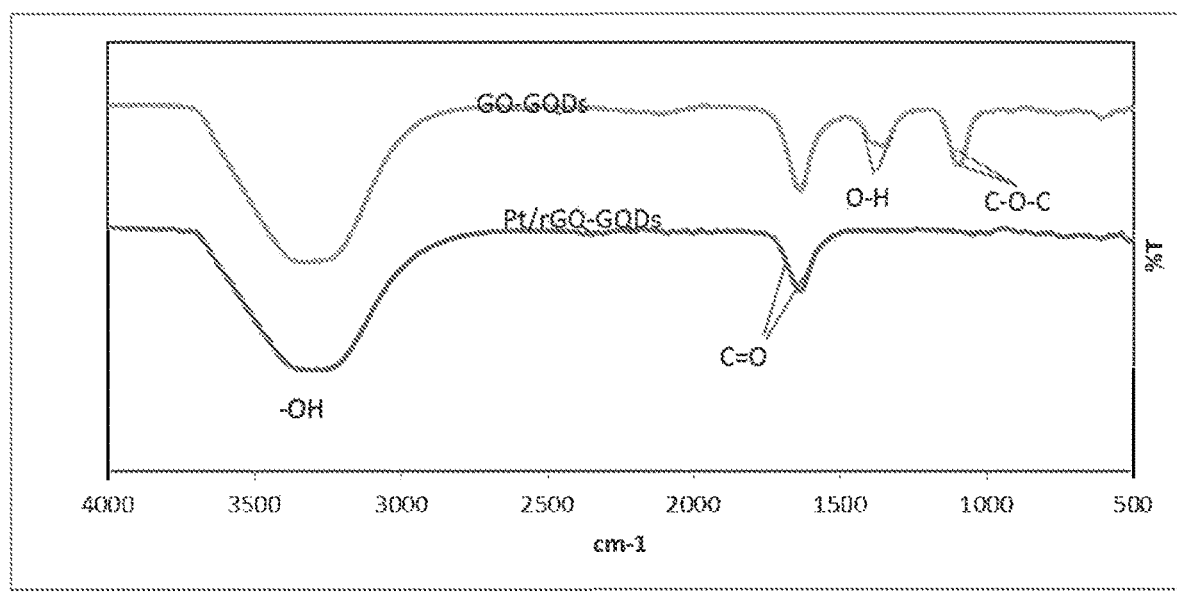
FIG. 6. IR spectrum of GO-GQDs and 20% Pt/rGO-GQDs(R) catalyst.

FT-IR spectra show functional groups of GO-GQDs and 20% Pt/rGO-GQDs(R) catalysts (FIG. 6). Absorption bands of GO-GQDs and 20% Pt/rGO-GQDs(R) at 3300-3500 $cm^{-1}$ represent the long-lasting vibration of O—H. Oscillations at 1590 $cm^{-1}$ represent the oscillation of C=O (extended carboxyl or carboxyl group). Particularly for GO-GQDs sample, oscillations occur at 1350 $cm^{-1}$ (O—H in C—OH bonds) and 1135 $cm^{-1}$ (asymmetric bonds C—O—C in epoxide structure). For Pt/rGO-GQDs(R) catalyst sample, there is no O—H oscillation (at 1350 $cm^{-1}$) and C—O—C oscillation (at 1135 $cm^{-1}$). This result demonstrates that the introduction of Pt has completely removed these functional groups on the surface of graphene materials and graphene quantum dots.

EDX Analysis

Figure 7:
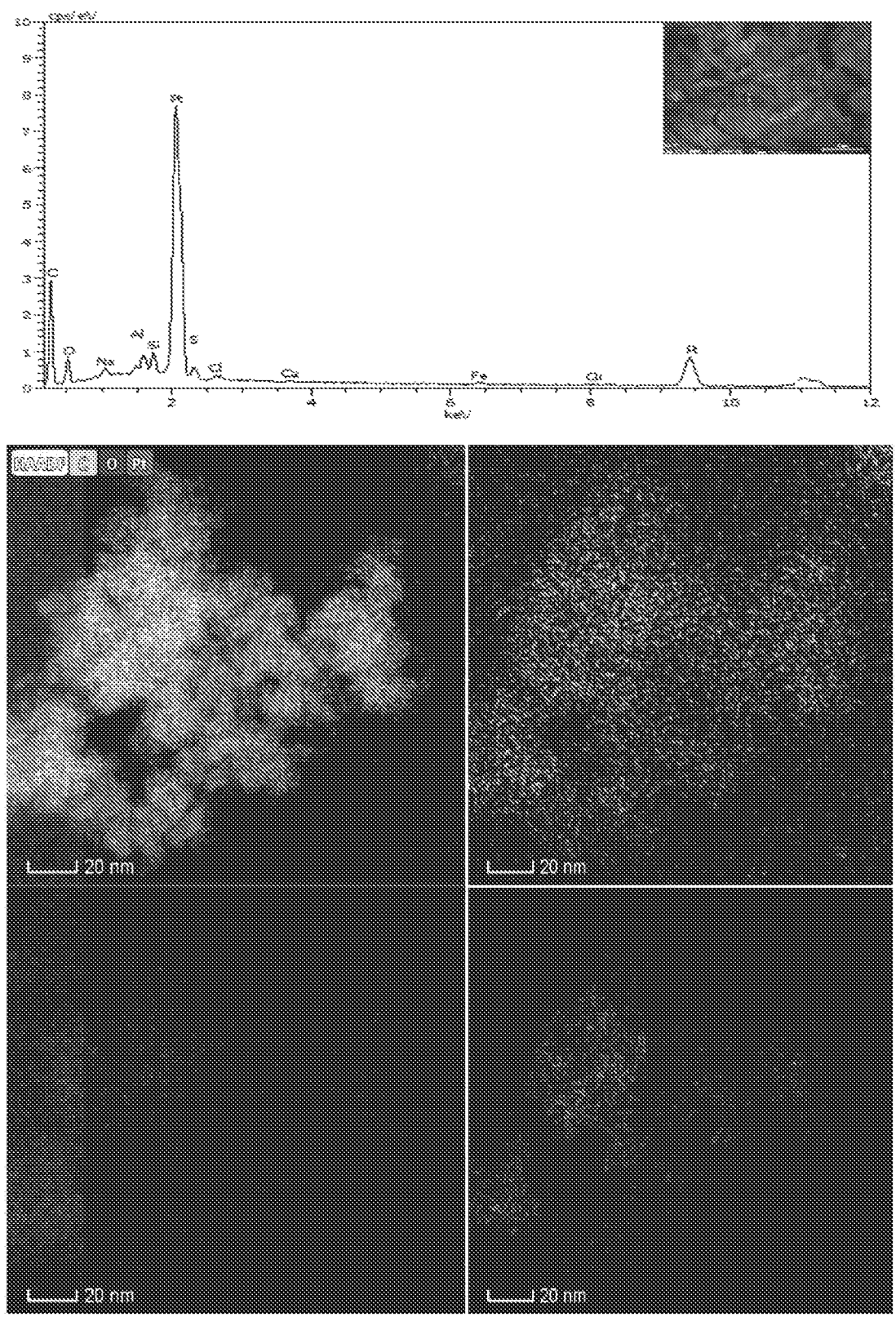
FIG. 7. EDX diagram of 20% Pt/rGO-GQDs(R) catalyst.

Characteristic EDX results (FIG. 7) of the 20% Pt/rGO-GQDs(R) catalysts showed the composition of the 20% Pt/rGO-GQDs(R) catalysts included C, O and Pt. In particular, C accounts for the majority and surface Pt content is about 50% (by weight).

EDX Spectrum Analysis

Figure 8:
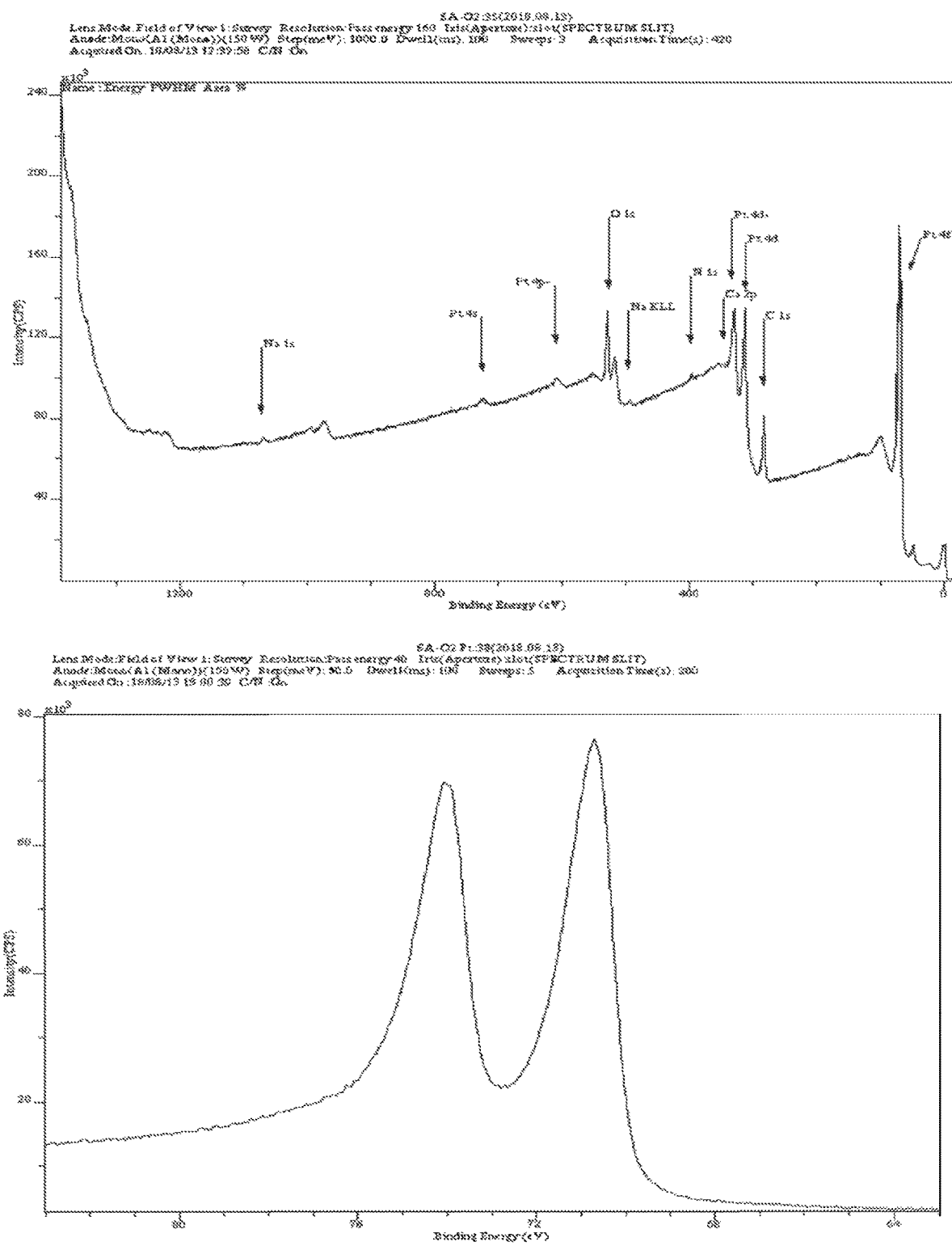
FIG. 8. XPS result of 20% Pt/rGO-GQDs (R) catalyst.

The results of determining the composition and chemical state on the surface of 20% Pt/rGO-GQDs(R) catalyst by XPS method (FIG. 8) show the presence of C, O and Pt on the surface of catalyst, with characteristic peaks of C1s, O1s and Pt4f. XPS spectrum of Pt 4f consists of a peak with intensity at 71 eV that characterizes for $Pt^0$ (40%) and a peak with intensity at 74 eV that characterizes for $Pt^{2+}$ (60%).

ICP Analysis

The result of Pt content analysis by ICP method shows that 20% Pt/rGO-GQDs(R) catalyst contains 12.28% Pt.

Evaluate the Electrochemical Activity of 20% Pt/rGO-GQDs(R) Catalyst

Electrochemical measurements were carried out at room temperature on the PGS-ioc-HH12 Potentiostat/Galvanostat device with a three-electrode system. The working electrode is a glass carbon electrode (5 mm in diameter), coated with 10 μl of coating solution and allowed to dry naturally at room temperature. The reference electrode is a platinum electrode and a comparison electrode is an Ag/AgCl electrode. The potential values presented in the article are values compared to this comparison electrode. The electrode coating solution is prepared by dispersing 1 mg of catalyst powder into a solution containing 0.9 mL of ethanol and 0.1 mL of 5% Nafion solution and ultrasonic vibration for 30 minutes. The electrochemical solution was $N_2$ saturated to remove residual $O_2$ before performing measurements.

Activity of 20% Pt/rGO-GQDs(R) Catalyst in the Electrochemical Oxidation Reaction of Ethanol The electrochemical activity of 20% Pt/rGO-GQDs(R) catalyst in ethanol oxidation reaction was evaluated by circulating potential scanning in acidic medium (ranging from 0 to 1 V with a scan rate of 50 mV/s, in $C_2H_5OH$ 1 M+$H_2SO_4$ 0.5 M solution), and in alkaline medium (ranging from −0.8 to 0.5 V with a at a scan rate of 50 $mV/s^{-1}$, in $C_2H_5OH$ 1 M+NaOH 0.5 M solution).

Figure 9:
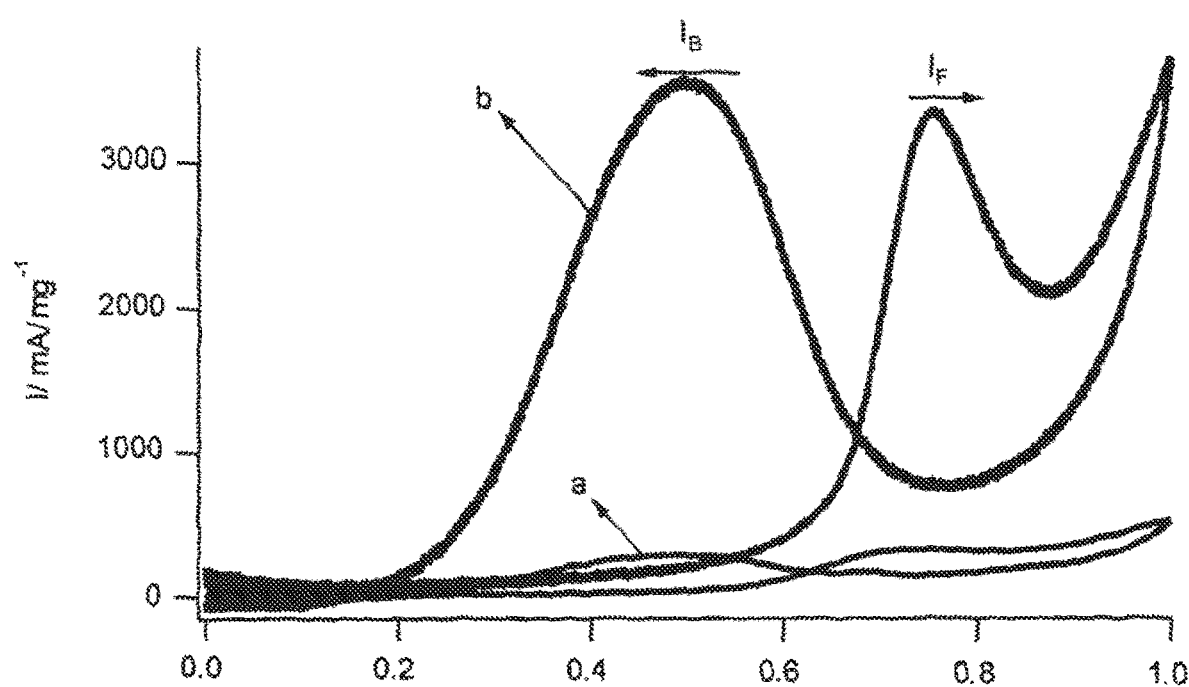
FIG. 9. Ethanol electrochemical oxidation activity of 20% Pt/rGO catalyst (a) and 20% Pt/rGO-GQDs(R) catalyst (b) in acidic medium ($C_2H_5OH$ 1 M+$H_2SO_4$ 0.5 M), at a scan rate of 50 mV/s.
Figure 10:
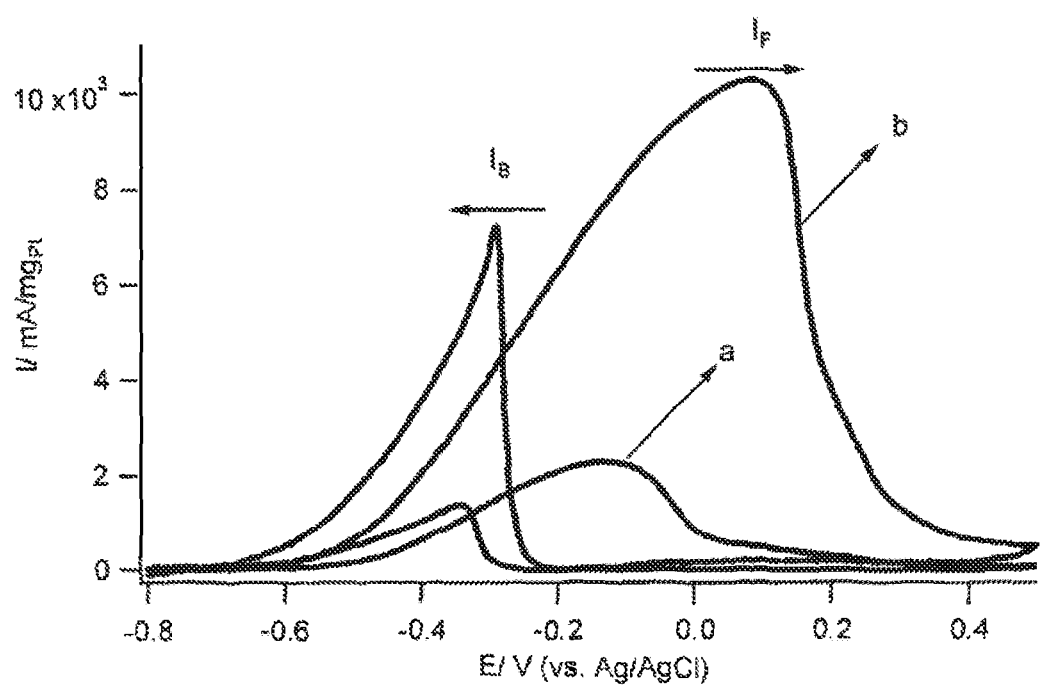
FIG. 10. Ethanol electrochemical oxidation activity of 20% Pt/rGO catalyst (a) and 20% Pt/rGO-GQDs(R) catalyst (b) in alkaline medium ($C_2H_5OH$ 1 M+NaOH 0.5 M), at a scan rate of 50 mV/s.

Results of the cyclic voltammetry measurement (CV) in the acidic medium and alkaline medium, in order to evaluate the catalyst efficiency of 20% Pt/rGO and 20% Pt/rGO-GQDs(R) catalysts, during electrochemical oxidation of ethanol, are respectively presented in FIG. 9 and FIG. 10. Results of evaluation of catalytic activity show that during anodic scanning, the oxidation potential began to occur around value of 0.5 V (acidic medium—FIG. 9), −0.4 V (alkaline medium—FIG. 10), then increased strongly due to occurrence of ethanol oxidation and reached its maximum value in the range of 0.7-0.8 V (acidic medium—FIG. 9) and −0.2 to 0 V (alkaline medium—FIG. 10). The amount of forward scanning current density ($I_F$) in acidic and alkaline medium, respectively 3381 mA/$mg_{Pt}$ and 10285 mA/$mg_{Pt}$, is characteristic for this process (Table 1). During cathode scanning process, peaks that are characteristic of oxidation of intermediate compounds (produced during the oxidation of ethanol) appeared and were adsorbed on the electrode surface from 0.2 to 0.6 V in acidic medium (FIG. 9) and from −0.6 to −0.2 V in alkaline medium (FIG. 10). The catalyst is well resistant to $CO_{hp}$ poison and its high electrochemical activity is shown by high $I_F/I_R$ ratio in acidic medium (0.94) and alkaline medium (1.4)—Table 1.

FIG. 9 and FIG. 10 show that, compared to 20% Pt/rGO catalyst, 20% Pt/rGO-GQDs (R) catalyst has a significant increase in electrochemical activity (a strong increase in the $I_F$ density) suggesting that the simultaneous presence of graphene and graphene quantum dots increased the density and improved the dispersion of Pt nanoparticles, thus increasing the exposure of Pt to ethanol. The results of the electrochemical potential calculation by mass of the activity phase of the catalysts in acidic medium increase gradually in order: 20% Pt/rGO (328 mA/$m_{Pt}$)<20% Pt/rGO-GQDs(R) (3381 mA/$mg_{Pt}$), in alkaline medium: 20% Pt/rGO (2293 mA/$mg_{Pt}$)<20% Pt/rGO-GQDs(R) (10285 mA/$mg_{Pt}$)—Table 1.

Thus, the experiment of scanning the CV potential proved that the 20% Pt/rGO-GQDs(R) catalyst that had electrochemical catalytic activity for ethanol oxidation reaction was significantly improved compared to Pt/rGO catalyst. This can be explained by the simultaneous presence of graphene and graphene quantum dots that have created a synergistic effect with Pt to increase the density and dispersion of Pt, leading to the adsorption of ethanol on the surface of preferred catalyst, increasing catalytic activity.

Activity of 20% Pt/rGO-GQD(R) Catalyst in the Electrochemical Oxidation Reaction of Methanol 20% Pt/rGO-GQDs(R) catalyst was investigated in the electrochemical oxidation reaction of methanol in both acidic and alkaline mediums under the same conditions and parameters as the electrochemical oxidation reaction of ethanol.

Figure 11:
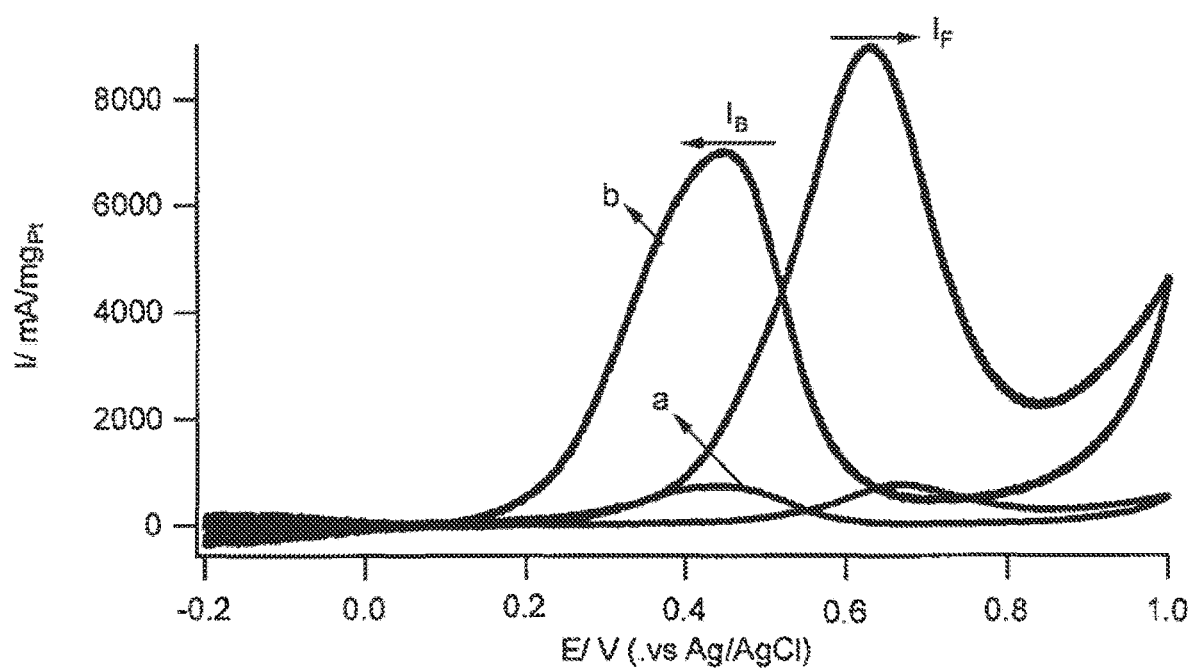
FIG. 11. Methanol electrochemical oxidation activity of 20% Pt/rGO catalyst (a) and 20% Pt/rGO-GQDs(R) catalyst in acidic medium ($CH_3OH$ 1 M+$H_2SO_4$ 0.5 M), at a scan rate of 50 mV/s.

The CV result of the 20% Pt/rGO-GQDs catalyst (R) were compared with the electrochemical catalysis results of 20% Pt/rGO, respectively presented in the FIG. 11, FIG. 12, and Table 2. On the CV chart of 20% Pt/rGO-GQDs catalyst, a methanol oxidation peak appears around 0.4 V potential value and reaches a maximum in the range of 0.6-0.7 V (acid medium—FIG. 11), −0.5 V (in alkaline medium) and peaks at about −0.3 to −0.1 V, slightly lower than ethanol and its peak intensity is relatively higher than that of ethanol. This is explained by the fact that the activation energy of the methanol electrochemical oxidation reaction is much lower than that of ethanol due to the low energy consumption to break the C—C bond. The amount of the forward scanning current density reaching 9063 mA/$mg_{Pt}$ in the acidic medium and 18,096 mA/$mg_{Pt}$ in the alkaline medium is characteristic for this process. In addition, the catalyst is highly resistant to $CO_{hp}$ poison, proved by the high $I_F/I_R$ ratio in acidic medium (1.29) and the alkaline medium (4.22)—Table 1.

FIG. 11 and FIG. 12 show that, compared to 20% Pt/rGO catalyst, 20% Pt/rGO-GQDs(R) catalyst has significantly higher electrochemical activity, indicating that the simultaneous presence of graphene and graphene quantum dots increases the density as well as the ability to disperse Pt nanoparticles, thereby improving the ability of contact between Pt and methanol in the electrochemical oxidation reaction. Mass activity (mA/$mg_{Pt}$), in both mediums are arranged in the following order: 20% Pt/rGO<20% Pt/rGO-GQDs(R)—Table 1.

Thus, the CV experiments proved that 20% Pt/rGO-GQDs(R) catalyst has significantly higher electrochemical activity than 20% Pt/rGO catalyst in oxidation reaction of methanol. This can be explained by the simultaneous presence of graphene and graphene quantum dots that creates synergistic effects with Pt, helping improve the dispersion and density of Pt on the surface of graphene materials. This is believed to be the cause of the preferential adsorption of methanol on the catalytic surface, leading to an increase in the electrochemical activity of the catalyst.

Comparison of Electrochemical Activity of Catalysts

Results of the test of electrochemical alcohol oxidation activity of Pt/GQDs and Pt/rGO-GQDs catalysts in this invention in acidic and alkaline medium showed the activity of Pt/GQDs and Pt/rGO-GQDs catalysts is much higher than the activity of published Pt/rGO catalysts. In particular, 3% Pt/GQDs and 3% Pt/rGO-GQDs catalysts have the highest activity among the studied catalysts.

Advantages of the Invention

Catalyst based on Pt or noble metal, dispersed on support, used as anode catalysts for fuel cells for direct use of alcohol, have been published, owning high concentrations of Pt metals, usually 20-40%, even up to 60%. Furthermore, these catalysts are primarily developed for electrochemical oxidation of methanol, which is rarely used for electrochemical oxidation of ethanol. GQDs carrier have not been studied for use as carrier for electrochemical oxidation of alcohol in DAFC. In particular, no studies have been published regarding a simple method to prepare GQDs-containing support that is highly effective for electrochemical oxidation of alcohol.

Pt/GQDs catalysts in this invention, containing Pt, with a low Pt content, dispersed on graphene quantum dots, have a much lower price than the current catalysts, thanks to economical use of noble metal during the process. At the same time, Pt/GQD catalysts have excellent activity in the electrochemical oxidation of alcohol (methanol, ethanol), which is suitable for use as an anode catalyst for DAFC.

In particular, Pt/rGO-GQDs catalysts in this invention, containing Pt, with a low Pt content, dispersed on mixture of graphene and graphene quantum dots, have a much lower price than Pt/GQDs catalysts, thanks to not only economical use of noble metal during the process, but also simple, effective, low-cost preparing method which do not waste carbon (graphene) and is able to increase capacity easily. Pt/rGO-GQDs catalysts have high activity and stability in the electrochemical oxidation of alcohol that are suitable for an anode catalyst in DAFC.

The invention claimed is:

1. A method for preparing a catalyst based on platinum (Pt) dispersed on a carrier containing graphene quantum dots, the method comprising the following steps:
   step 1: prepare a carrier containing graphene quantum dots:
   reacting a carbon fiber, which was ground to powder (carbon fiber powder) react with a mixture of $HNO_3$ 70% and $H_2SO_4$ 98%, with a mass ratio of carbon fiber powder to a volume of $HNO_3$ 70% and $H_2SO_4$ 98% in the range 1:20:30 to 1:60:90, under transducer ultrasound reaction, with a capacity of 750 W and then proceeding to a reflux reaction, allowing the mixture to cool down to room temperature, neutralizing the mixture to pH=7 with NaOH solution in cold ice, then handle neutralizing solution in either of the following two ways:

a.1. adding the neutralizing mixture to the dialysis membrane 1000 Da, conducting dialysis with deionized water to obtain a liquid containing graphene quantum dots (GQDs) in the dialysis membrane to use as a carrier or a.2. crystalizing salts present in the neutralizing mixture, filtering and removing the crystalized crystals from the filtrate to obtain a filtrate containing a mixture of graphene oxide and graphene quantum dot (GO-GQDs) to use as a carrier;

step 2: prepare catalyst based on Pt dispersed on graphene quantum dots:

adding a solution containing a Pt precursor to the liquid obtained in step 1 (a.1) or to the filtrate obtained in step 1 (a.2) then carrying out the ultrasonic reaction, after that proceeding with Pt ion reduction with $NaBH_4$ 0.15 M solution at the temperature ranging from about 25° C. to 80° C., next recover and purify solid products by centrifugation and washing by centrifugation several times with demineralized water, drying in vacuum to obtain the catalyst comprising Pt dispersed on graphene quantum dots and the catalyst based on Pt dispersed on a carrier containing a mixture of graphene oxide and graphene quantum dots, useful as anode catalyst for DAFC.

2. The method according to claim 1, wherein the solution containing Pt precursor is a $H_2PtCl_6$ salt solution in water, having concentration of 0.01 M.

3. The method of claim 1, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

4. The method of claim 1, wherein step 2, to obtain the catalyst based on Pt dispersed on the carrier containing a mixture of graphene oxide and graphene quantum dots, it is possible to conduct the reaction under the effect of microwaves by adding ethylene glycol 99.5% to the GO-GQDs mixture obtained in step 1 a.2, with the volume ratio of ethylene glycol solution to the volume of the mixture containing GO-GQDs ranging from about 2:1 to 7:1, conduct transducer ultrasound reaction, for about 1 minute to 12 minutes, obtaining EG-GO-GQDs mixture; then, add $H_2PtCl_6$ 0.01 M solution to the EG-GO-GQDs mixture, with a volume ratio of $H_2PtCl_6$ 0.01 M solution compared to the volume of the GO-GQDs mixture ranging from about 1:5 to 1:97 and transfer the mixture to a microwave reactor, heating the mixture to about 200° C. for 20 to 30 minutes; keep thermally stable from 10 to 60 minutes, cool down the mixture to room temperature; centrifuging to obtain a solid product, then wash several times with demineralized water and dry in a vacuum, obtaining a catalyst based on Pt dispersed on carrier containing a mixture of graphene oxide and graphene quantum dots in the form of solid used as anode catalyst for DAFC.

5. The method of claim 2, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

6. A catalyst based on platinum (Pt) P dispersed on a carrier containing graphene quantum dots (Pt/GQDs), obtained by a method comprising the following steps:

step 1: prepare a carrier containing graphene quantum dots:

reacting a carbon fiber, which was ground to powder (carbon fiber powder) react with a mixture of $HNO_3$ 70% and $H_2SO_4$ 98%, with a mass ratio of carbon fiber powder to a volume of $HNO_3$ 70% and $H_2SO_4$ 98% in the range 1:20:30 to 1:60:90, under transducer ultrasound reaction, with a capacity of 750 W and then proceeding to a reflux reaction, allowing the mixture to cool down to room temperature, neutralizing the mixture to pH=7 with NaOH solution in cold ice, then handle neutralizing solution in either of the following two ways:

a.1. adding the neutralizing mixture to the dialysis membrane 1000 Da, conducting dialysis with deionized water to obtain a liquid containing graphene quantum dots (GQDs) in the dialysis membrane to use as a carrier or a.2. crystalizing salts present in the neutralizing mixture, filtering and removing the crystalized crystals from the filtrate to obtain a filtrate containing a mixture of graphene oxide and graphene quantum dot (GO-GQDs) to use as a carrier;

step 2: prepare catalyst based on Pt dispersed on graphene quantum dots:

adding a solution containing a Pt precursor to the liquid obtained in step 1 (a.1) or to the filtrate obtained in step 1 (a.2) then carrying out the ultrasonic reaction, after that proceeding with Pt ion reduction with $NaBH_4$ 0.15 M solution at the temperature ranging from about 25° C. to 80° C., next recover and purify solid products by centrifugation and washing by centrifugation several times with demineralized water, drying in vacuum to obtain the catalyst comprising Pt dispersed on graphene quantum dots and the catalyst based on Pt dispersed on a carrier containing a mixture of graphene oxide and graphene quantum dots, useful as anode catalyst for DAFC; and, wherein the Pt content in the catalyst ranging from about 1% to 20% by weight.

7. The catalyst of claim 6, wherein the catalyst is an anode catalyst in fuel cells.

8. The catalyst of claim 7, wherein the solution containing Pt precursor is a $H_2PtCl_6$ salt solution in water, having concentration of 0.01 M.

9. The catalyst of claim 7, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

10. The catalyst of claim 6, wherein the solution containing Pt precursor is a $H_2PtCl_6$ salt solution in water, having concentration of 0.01 M.

11. The catalyst of claim 10, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

12. The catalyst of claim 6, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

13. A catalyst based on platinum (Pt) Pt dispersed on carrier containing a mixture of graphene oxide and graphene quantum dots graphene (Pt/rGO-GQDs), obtained by a method comprising the following steps:
step 1: prepare a carrier containing graphene quantum dots:
reacting a carbon fiber, which was ground to powder (carbon fiber powder) react with a mixture of $HNO_3$ 70% and $H_2SO_4$ 98%, with a mass ratio of carbon fiber powder to a volume of $HNO_3$ 70% and $H_2SO_4$ 98% in the range 1:20:30 to 1:60:90, under transducer ultrasound reaction, with a capacity of 750 W and then proceeding to a reflux reaction, allowing the mixture to cool down to room temperature, neutralizing the mixture to pH=7 with NaOH solution in cold ice, then handle neutralizing solution in either of the following two ways:
a.1. adding the neutralizing mixture to the dialysis membrane 1000 Da, conducting dialysis with deionized water to obtain a liquid containing graphene quantum dots (GQDs) in the dialysis membrane to use as a carrier or
a.2. crystalizing salts present in the neutralizing mixture, filtering and removing the crystalized crystals from the filtrate to obtain a filtrate containing a mixture of graphene oxide and graphene quantum dot (GO-GQDs) to use as a carrier;
step 2: prepare catalyst based on Pt dispersed on graphene quantum dots:
adding a solution containing a Pt precursor to the liquid obtained in step 1 (a.1) or to the filtrate obtained in step 1 (a.2) then carrying out the ultrasonic reaction, after that proceeding with Pt ion reduction with $NaBH_4$ 0.15 M solution at the temperature ranging from about 25° C. to 80° C., next recover and purify solid products by centrifugation and washing by centrifugation several times with demineralized water, drying in vacuum to obtain the catalyst comprising Pt dispersed on graphene quantum dots and the catalyst based on Pt dispersed on a carrier containing a mixture of graphene oxide and graphene quantum dots, useful as anode catalyst for DAFC; and,
wherein the Pt content in the catalyst ranging from about 1% to 20% by weight.

14. The catalyst of claim 13, wherein the catalyst is a catalyst in fuel cells.

15. The catalyst of claim 14, wherein the solution containing Pt precursor is a $H_2PtCl_6$ salt solution in water, having concentration of 0.01 M.

16. The catalyst of claim 14, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

17. The catalyst of claim 13, wherein the solution containing Pt precursor is a $H_2PtCl_6$ salt solution in water, having concentration of 0.01 M.

18. The catalyst of claim 17, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

19. The catalyst of claim 13, wherein step 1 is carried out at the mass ratio of carbon fiber powder to the volume of $HNO_3$ 70% and $H_2SO_4$ 98% acid ranging from about 1:20:30 to 1:60:90, more preferably ranging from about 1:30:45 to 1:48:72, most preferably ranging from about 1:32:48 to 1:48:72.

20. The catalyst of claim 13, wherein step 2, to obtain the catalyst based on Pt dispersed on the carrier containing a mixture of graphene oxide and graphene quantum dots, it is possible to conduct the reaction under the effect of microwaves by adding ethylene glycol 99.5% to the GO-GQDs mixture obtained in step 1 a.2, with the volume ratio of ethylene glycol solution to the volume of the mixture containing GO-GQDs ranging from about 2:1 to 7:1, conduct transducer ultrasound reaction, for about 1 minute to 12 minutes, obtaining EG-GO-GQDs mixture; then, add $H_2PtCl_6$ 0.01 M solution to the EG-GO-GQDs mixture, with a volume ratio of $H_2PtCl_6$ 0.01 M solution compared to the volume of the GO-GQDs mixture ranging from about 1:5 to 1:97 and transfer the mixture to a microwave reactor, heating the mixture to about 200° C. for 20 to 30 minutes; keep thermally stable from 10 to 60 minutes, cool down the mixture to room temperature; centrifuging to obtain a solid product, then wash several times with demineralized water and dry in a vacuum, obtaining a catalyst based on Pt dispersed on carrier containing a mixture of graphene oxide and graphene quantum dots in the form of solid used as anode catalyst for DAFC.

* * * * *